(12) United States Patent
Aydogdu et al.

(10) Patent No.: US 11,656,322 B2
(45) Date of Patent: May 23, 2023

(54) METHOD FOR REDUCING MUTUAL INTERFERENCE IN RADARS

(71) Applicant: Chalmers Ventures AB, Gothenburg (SE)

(72) Inventors: Canan Aydogdu, Gothenburg (SE); Henk Wymeersch, Gothenburg (SE)

(73) Assignee: RADCHAT AB, Gothenburg (SE)

( * ) Notice: Subject to any disclaimer, the term of this patent is extended or adjusted under 35 U.S.C. 154(b) by 164 days.

(21) Appl. No.: 16/502,414

(22) Filed: Jul. 3, 2019

(65) Prior Publication Data
US 2021/0003662 A1 Jan. 7, 2021

(51) Int. Cl.
  G01S 7/02 (2006.01)
  G01S 7/00 (2006.01)
  G01S 7/35 (2006.01)
  G01S 13/931 (2020.01)
(52) U.S. Cl.
  CPC .............. *G01S 7/023* (2013.01); *G01S 7/006* (2013.01); *G01S 7/0235* (2021.05); *G01S 7/35* (2013.01); *G01S 13/931* (2013.01)
(58) Field of Classification Search
  None
  See application file for complete search history.

(56) References Cited

U.S. PATENT DOCUMENTS

| 10,739,438 B2 * | 8/2020 | Harrison | G01S 13/726 |
| 2015/0230160 A1 * | 8/2015 | Lin | H04W 76/18 |
| | | | 370/252 |
| 2019/0056476 A1 * | 2/2019 | Lin | G01S 7/023 |
| 2019/0219683 A1 * | 7/2019 | Fang | G01S 7/35 |
| 2019/0250261 A1 * | 8/2019 | Itkin | H04B 1/44 |
| 2019/0293748 A1 * | 9/2019 | Gulati | H04W 74/004 |
| 2019/0339358 A1 * | 11/2019 | Rimini | G01S 7/0232 |
| 2019/0383925 A1 * | 12/2019 | Gulati | G01S 13/345 |
| 2019/0391247 A1 * | 12/2019 | Gulati | G01S 7/0232 |
| 2020/0025866 A1 * | 1/2020 | Gulati | G01S 7/0235 |
| 2020/0072941 A1 * | 3/2020 | Jansen | G01S 13/345 |
| 2020/0309933 A1 * | 10/2020 | Ray | G01S 13/282 |
| 2020/0319327 A1 * | 10/2020 | Tsvelykh | G05D 1/0022 |

OTHER PUBLICATIONS

Aydogdu, et al., "Radar Communications for Combating Mutual Interference of FMCW Radars", Jul. 5, 2018, 6 pages.

* cited by examiner

*Primary Examiner* — Marcus E Windrich
(74) *Attorney, Agent, or Firm* — Buchanan Ingersoll & Rooney P.C.

(57) ABSTRACT

A distributed FMCW radar communication system for interference mitigation in an ego unit comprising at least one RadCom unit arranged for radar sensing in a radar mode and for data communication in a communication mode with at least one target unit by switching between the radar mode and the communication mode in time and using separate frequency bands for the radar mode and the communication mode, using a random medium access technique for communication, where the ego unit comprises a plurality of RadCom units and a control unit adapted to control the plurality of RadCom units to use different starting times and frequency bands based on at least one received control message by means of communication during a radar frame duration (Tf) received by means of the data communication, where the starting times of different FMCW radars are separated sufficiently so as they are orthogonal.

8 Claims, 5 Drawing Sheets

METHOD FOR REDUCING MUTUAL INTERFERENCE IN RADARS

TECHNICAL FIELD

The present invention relates to a method for reducing mutual interference between radars in e.g. vehicles or other moving object, which is adapted to minimize the interference from one radar to another radar using the same frequency.

BACKGROUND ART

Commercial automotive radars used today are based on frequency modulated continuous wave signals due to the simple and robust detection method and good accuracy. However, the increase in both the number of radars deployed per vehicle and the number of such vehicles leads to mutual interference, cutting short future plans for autonomous driving and active safety functionality.

Automotive radar is becoming an indispensable equipment in modern cars, for different functions including adaptive cruise control and parking, especially due to its insensitivity to bad weather conditions. Today, most automotive radar systems operate at 76-81 GHz, which provides good range resolution, on the order of centimetres and the possibility to mitigate interference by locating the radars at different carrier frequencies. Likewise, vehicle-to-vehicle (V2V) communications is becoming a standard, having proven its value in dissemination of safety critical information. However, both technologies have limitations related to the increased penetration rates. For example, current automotive radar sensors are not controllable or able to coordinate with sensors on other vehicles. Hence, mutual radar interference between different vehicles may become a problem, resulting in an increased noise floor, in turn resulting in reduced detection capability and ghost detections.

There is thus room for an improved radar communication system for a vehicle.

DISCLOSURE OF INVENTION

An object of the invention is therefore to provide an improved radar communication system which mitigates interference between different radar units. A further object of the invention is to provide an improved radar communication system which is adapted to transmit control messages to other radar units.

The solution to the problem according to the invention is described in claim 1 and claim 5 regarding the radar communication system. The other claims contain advantageous further developments of the inventive radar communication system.

In a distributed FMCW radar communication system for interference mitigation in an ego unit comprising a RadCom unit arranged for radar sensing in a radar mode and for data communication in a communication mode with at least one target unit comprising a RadCom unit, the object of the invention is achieved by switching between the radar mode and the communication mode in time and using separate frequency bands for the radar mode and the communication mode, using a random medium access technique for communication, where the communicated control message information is used for a co-allocated multiple FMCW radar sensor in both the ego unit and the at least one target unit to a portion of a radar frame duration ($T_f$), where the starting times of different FMCW radar sensors are separated sufficiently so as they are orthogonal.

By this first embodiment of a radar communication system according to the invention, a radar communication system comprising RadCom units use a small part of the radar bandwidth to create an 802.11p-like vehicle-to-vehicle (V2V) connection. The V2V channel is controlled via e.g. a carrier sense multiple access (CSMA) protocol and is utilized to control the timing of the radar signals. Vehicles are assumed to perform µs-level clock synchronization with e.g. GPS. The inventive system can significantly reduce or mitigate the radar interference between two radar systems, with no performance degradation in terms of radar accuracy. The radar communication system may be used for radar systems arranged on different objects, such as vehicles or aeroplanes, and is suitable for a vehicle based system comprising a plurality of vehicles provided with radar units and also stationary radar units arranged in e.g. road signs. By communicating a start time for the radar signal of the ego vehicle to the other radar units in the system, each radar unit can select a start time that does not interfere with the start times of the other radar units in the vicinity. The other radar units will at the same time communicate their own start time to all other radar units in the vicinity, i.e. in listening distance to the transmitting radar unit, such that all radar units will adapt their start time depending on the start time of the other radar units.

When several radar units come in listening distance to each other, there may be some interference between the radar units since some of the radar units may use the same start time for their radar signals. After one or a few iterations, the radar units will adapt their start time such that all radar units use a unique start time, and there is no interference between the radar units. In this way, it can be ensured that e.g. a pedestrian can be detected in a secure way without the detection being disturbed by another radar unit.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

The radar communication system comprises an FMCW transmitter and an FMCW receiver. The FMCW radar transmits a sequence of frequency modulated continuous waves, i.e., chirps. An example of a sawtooth FMCW signal is shown in FIG. 1, of the form $$s_r(t) = \sqrt{P_r} \sum_{k=0}^{N-1} c(t-kT)$$

where c(t) is a chirp of the form $$c(t) = \begin{cases} e^{j\phi(t)}, & 0 \le t \le T \\ 0, & \text{otherwise} \end{cases}$$

with $\phi(t) = 2\pi\left(f_r + \frac{B_r}{2T}t\right)t$ where $P_r$ is the radar transmit power, $B_r$ denotes the radar bandwidth (typically 1-4 GHz), $f_r$ is the carrier frequency (around 77 GHz), T is the chirp duration, and N is the number of chirps per frame. The frame time $T_f$=NT+$T_{idle}$ comprises NT plus the idle and processing time. The instantaneous frequency of c(t) is given by $$f(t) = \frac{1}{2\pi}\frac{d\phi(t)}{dt} = f_r + \frac{B_r}{T}t$$

Figure 1:
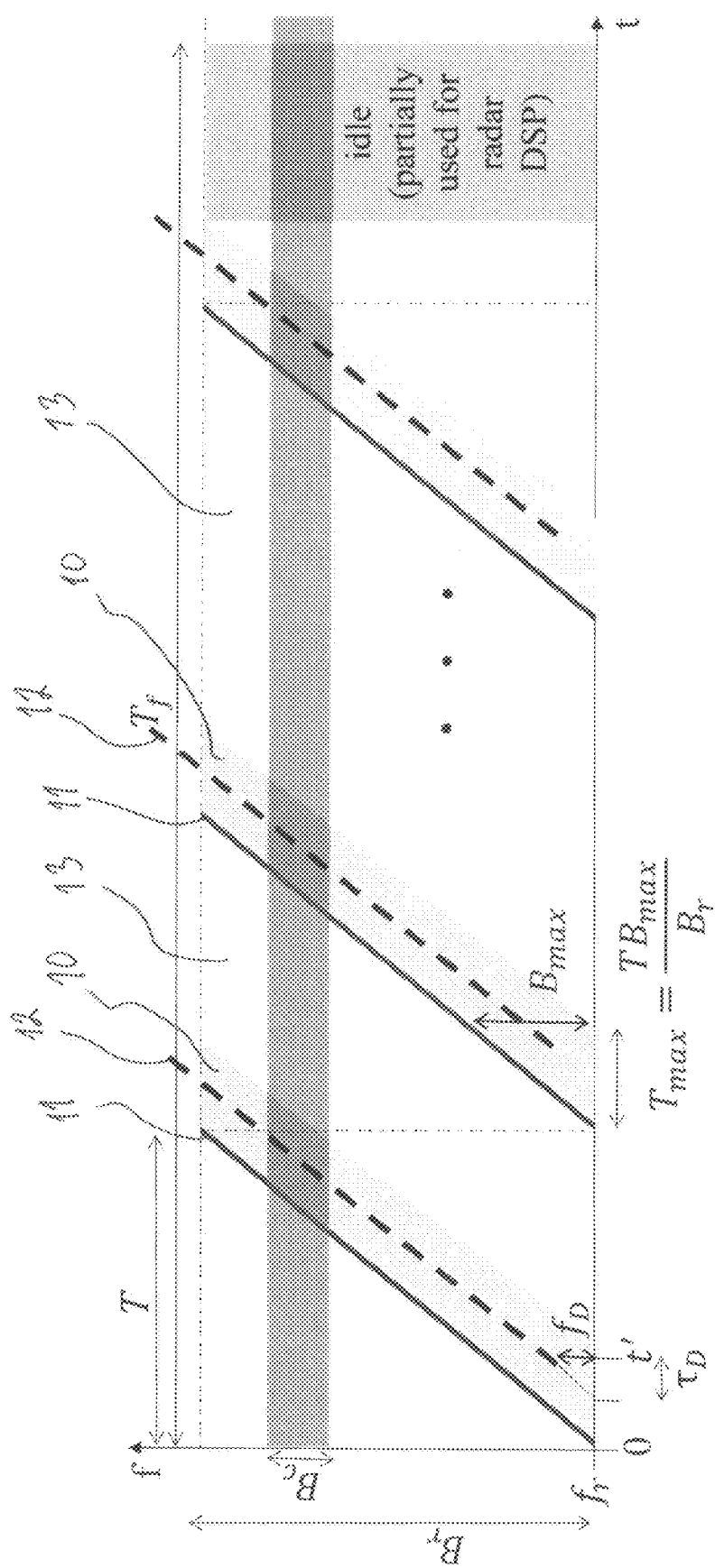
FIG. 1 shows an example of a typical FMCW sawtooth radar waveform suitable to be used in a radar communication system according to the invention.

The typical FMCW sawtooth radar waveform 11 shown in FIG. 1 has a chirp sequence starting at (t=0; f=$f_r$) in time-frequency domain. The reflected chirp sequences 12 are received starting at (t'; $f_r$+$f_D$), due to a round trip delay of t' and a Doppler frequency shift of $f_D$. The grey band 10 corresponds to the bandwidth $B_{max}$, which is defined as the bandwidth of interest at the radar receiver. Note that $B_{max} \le f_s$, where $f_s$ is the ADC bandwidth, assuming a complex baseband radar architecture. The radar receiver filters out the radar reflections arriving with frequencies outside $$\left(f_r + \frac{B_r}{T}t\right) + [-B_{max}, 0]$$

$B_{max}$ is proportional to the maximum delay of radar reflections taken into account ($T_{max}$) and the maximum detectable range ($d_{max}$).

The FMCW radar waveform parameters, such as $B_r$, T, $T_f$ and N, are set to meet requirements on the maximum detectable range ($d_{max}$) and maximum detectable relative velocity ($v_{max}$), as well as range and velocity resolution.

After N successive chirps, there is a significant idle time used for processing the samples. Further, the white region 13 indicates a large fraction of unused time-frequency resources.

In the co-located receiver, the backscattered radar signal is processed. The radar receiver comprises a mixer, an analog-to-digital convertor (ADC), and a digital processor. The mixer multiplies the received signal with a copy of the transmitted chirp. After low-pass filtering the resulting intermediate frequency (IF) signal, the mixer will output a signal with multiple harmonics at frequencies proportional to the time difference between the transmitted chirp and the received chirps. The output of the mixer is then sampled by the ADC, with sampling interval Ts, and passed to the digital processor which will detect and estimate the frequencies. The ADC bandwidth 1/(2 Ts) is generally on the order of 10-50 MHz and is thus much smaller than B. We assume that $d_{max}$ is limited by the ADC sampling rate.

Considering a single target at distance d, the sampled backscatter signal, sample n or chirp k is of the form (up to small perturbations and irrelevant phase shifts)

$$r_n^{(k)} = \sqrt{\gamma P_{tx} d^{-4}} \, e^{j2\pi\left(nT_s \frac{2dB}{cT} - 2f_D kT\right)} + w_n^{(k)}$$

where $\gamma = G_{tx} G_{rx} \sigma \lambda^2 / (4\pi)^3$ for target radar cross section (RCS) σ, transmitter and receiver antenna gains $G_{tx}$ and $G_{rx}$, Doppler frequency shift $f_D$=v$f_c$/(c), in which c denotes the speed of light, v is the relative velocity between vehicles (note that a positive v corresponds to approaching vehicles and a positive Doppler shift, which leads to a decreased time difference between the transmitted and reflected radar signal), $w_n^{(k)}$ is additive white Gaussian noise (AWGN) with variance $N_0$. A common approach to frequency retrieval in FMCW radar is to compute the fast Fourier transform (FFT) of the signal, average the signal through multiple chirp periods for enhanced SNR, and detect the peaks in the frequency-domain.

When two vehicles with frontmounted FMCW radars facing each other approach a roadcrossing where pedestrians are present, the radar signal from one vehicle will interfere with the reflected signal from the pedestrian. Both radars are FMCW based and use the same frequency band. Interference will occur in a vulnerable period V. V is defined as:

Given an ego vehicle radar that starts a FMCW transmission at time t=0 and a facing vehicle radar with overlapping field-of-view that starts a transmission at time t=τ, the vulnerable period V is the set of τ values for which interference to the ego vehicle radar occurs.

The vulnerable period for a radar to radar interference (R2R) is determined in the following way. The transmission by a second vehicle, which starts at time τ is received by a first vehicle at time t' and is equivalent to a chirp reception starting at t'−$\tau_D$ without any Doppler shift. $\tau_D$ is the perceived Doppler time delay and is obtained as follows after applying the triangle proportionality theorem to one FMCW chirp in FIG. 1.

$$\tau_D = Tf_D / B_r = $$
$$Tvf_r/(B_r c) \in [-T|v|f_r/(B_r c), +T|v|f_r/(B_r c)] \subset [-T|v_{max}|$$
$$f_r/(B_r c), +T|v_{max}|f_r/(B_r c)] \approx [-1/(4B_r), +1/(4B_r)]$$

where we have made use of the fact that the maximum radar detectable relative velocity is given by $v_{max}$=c/(4$f_r$T), and that vehicles may approach or recede.

R2R interference at the first chirp occurs when t'−$\tau_D \in$ [0, $T_{max}$], i.e. when a radar chirp from another radar falls inside the detection region of the ego radar, (the grey coloured region 10 in FIG. 1), where $T_{max}$=T$B_{max}$/$B_r$ corresponds to the maximum delay for detectable radar targets. Considering all possible distances, d/c∈ [0, $T_{max}$], the vulnerable period is given by V=[−$T_{max}$−1/(4$B_r$), $T_{max}$+1/(4$B_r$)].

In practice, $B_r \gg 1/T_{max}$ so this term may be ignored. Hence, the vulnerable period is approximately V=[−$T_{max}$, $T_{max}$], assuming a radar that can sample in-phase and quadrature samples and has perfect low-pass filtering.

Additional targets in the environment (such as pedestrians or other vehicles, etc.) may reflect the interference and cause multipath of the R2R interference. It has been shown that pedestrian-reflected interference does not affect the vulnerable period. The vulnerable period is set to include the maximum propagation delay of a direct interferer, which is $T_{max}$. Hence, multipaths of radar reflections do not impact the vulnerable period since reflections delayed by more than $T_{max}$ are filtered out by the radar hardware.

In case the complex receiver has an imperfect low-pass filter and cannot perfectly filter out frequencies below fs, then interference occurs when the reflected FMCW chirp sequence is received starting at $t' \in [0, 2T_{max}]$ in the worst case with a lowpass filter with strong sidelobe. Hence, the vulnerable period is extended to $V=[-T_{max}, 2T_{max}]$. In case the receiver only processes real numbers, then also negative frequencies must be taken into account, further extending the vulnerable period. In summary, depending on the filter sidelobes and ability of the ADC to sample in-phase and quadrature, the vulnerable period can be of duration $|V|=CT_{max}$, $C \geq 2$. Here, we define $|V|$ as the length of the (possibly non-contiguous) interval V. Unless otherwise specified, we will assume C=2.

An FMCW radar transmits N successive chirps and R2R interference occurs if any two chirps of two different vehicles overlap in the vulnerable period of a single chirp. Hence, any radar chirp sequence starting (N−1)T prior up to the end of the radar transmission may result in R2R interference due to one or more chirps overlapping. The vulnerable period taking a whole radar frame into account is $V^{(f)} = \cup_{k=-(N-1)}^{N-1} [kT - T_{max}, kT + T_{max}]$ and the vulnerable duration is $|V^{(f)}| = (2N-1)2T_{max} \approx 4NT_{max}$, since generally N≫1.

The probability of R2R interference among two vehicles is easily found as $$P_{R2R}^{int} = \frac{|V^{(f)}|}{T_f} = \frac{2(2N-1)UB_{max}}{NB_r} \approx \frac{4UB_{max}}{B_r}$$

where $U=NT/T_f \in (0,1]$ is the radar duty cycle, indicating that R2R interference is minimized with reduced radar bandwidth of interest $B_{max}$ (or longer chirps).

When there is interference, the interfering signal is often stronger than the useful signal. This affects radar performance in a number of ways: it leads to ghost targets and an increase of the noise floor. Relevant performance metrics are thus the probability of detection, the probability of false alarm, and the ranging accuracy of the targets.

In order to reduce interference between at least two vehicle radar systems, the inventive radar communication system comprises a RadCom unit and is an FMCW-based radar communication system composed of three parts for sharing the wireless channel resource: a multiplexing scheme for sharing among radar and communication, a radar media access control scheme (rMAC) for coordination of the radar sensing among different vehicles and a communication media access control scheme (cMAC) for sharing control messages among different vehicles.

Here, the radar and communication are frequency division multiplexed (FDM) with time division multiple access for radar signals (denoted rTDMA) and carrier-sense multiple access for communication signals (denoted cCSMA). The communication is used to disseminate non-overlapping rTDMA slots among radars to mitigate interference.

The signal is multiplexed by dividing the bandwidth B into a radar bandwidth $B_r$ and a communication bandwidth $B_c$, for which $B_r + B_c \leq B$ and $B_c < \frac{1}{2}T_s$. In this way, the radar ADC can be used for signal processing.

Figure 2:
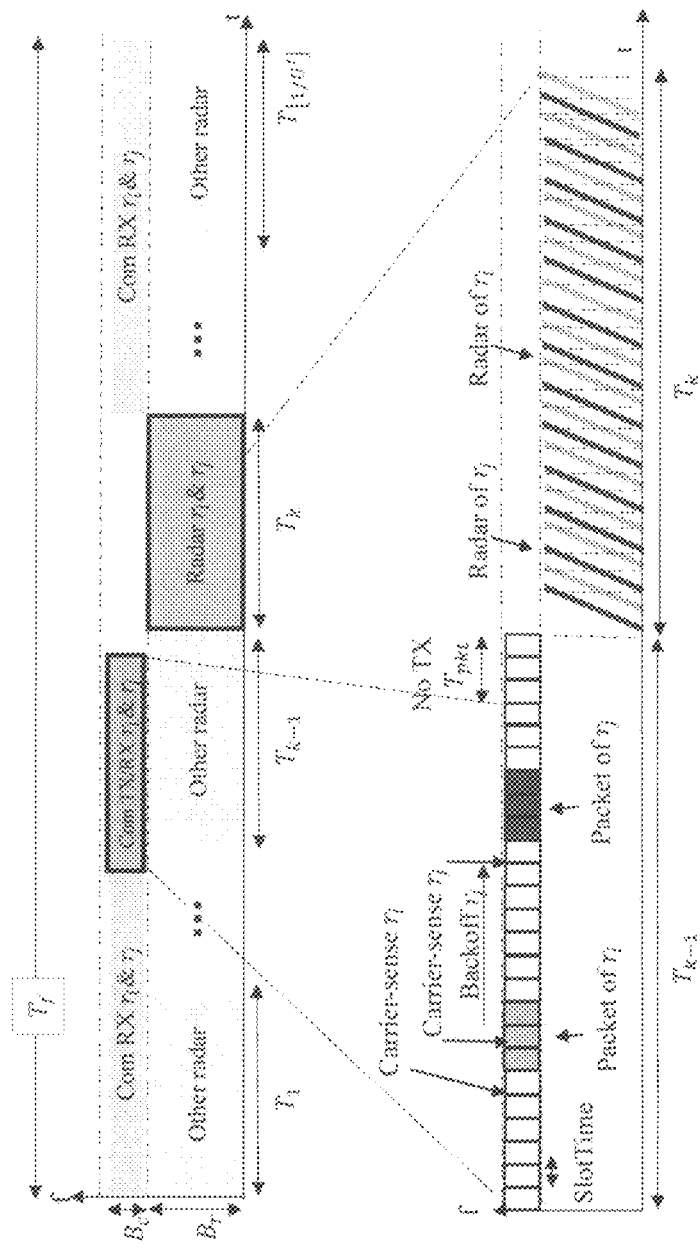
FIG. 2 shows an example of a division of the frequency-time domain for the data link control for two RadCom units according to the invention.

One or more FMCW radars facing each other operate interference-free if they are assigned non-overlapping rTDMA slots, which depend on the vulnerable duration. In order to secure an interference-free operation, the units or the vehicles are assumed to synchronize their clocks using GPS. FIG. 2 illustrates the division of the frequency-time domain for the inventive radar communication system using a RadCom unit, where the communication is based on FDM/rTDMA/cCSMA. One radar frame duration $T_f$ is divided into time slots $T_k$, where each radar transmits its chirp sequence during one $T_k$ and remains idle during rest of the radar frame $T_f$. One time slot $T_k$ is of length (N+1)T, which corresponds to the duration for sending N chirps plus one idle chirp time accounting for the overflow of time shifted rTDMA slots. This slotted time is set to provide non-overlapping chirp sequences and thereby to maximize the number of vehicles with no mutual interference in the radar communication system, denoted by $M_{max}$. Using the duration of the vulnerable period $|V|$, for the proposed rTDMA, at most $[T/|V|]$ different vehicle radars can coexist in a slot $T_k$ and the maximum number of time slots per frame is $K=[T_f/(N+1)T]$, which limits $M_{max}$ under perfect communications to (with non-ideal low-pass filtering and no complex radar architecture) $M_{max} \leq K\lfloor T/|V| \rfloor \approx K\lfloor 2B_r T_s/5 \rfloor$ V2V vehicular communications is used to assign non-overlapping rTDMA slots among facing vehicles. Since communication links are not necessarily symmetric due to the directivity of the radar, a best effort approach with no acknowledgements is employed. Communication during slot $T_{k-1}$ determines the rTDMA slots in $T_k$ as illustrated in FIG. 2. Each time slot $T_k$ is further divided to slots called SlotTimes, which are used by the non-persistent CSMA mechanism. Communication packets are transmitted if the channel is sensed idle for one SlotTime or a random backoff is employed if channel is sensed busy. Each vehicle sequentially uses two timeouts: a communication timeout (CommTo) for starting transmission of a communication packet and a radar timeout (RadarTo) for starting the radar chirp sequence. The radar timeout can also be seen as the next radar starting time, the time where another radar may start sending radar signals.

Figure 3:
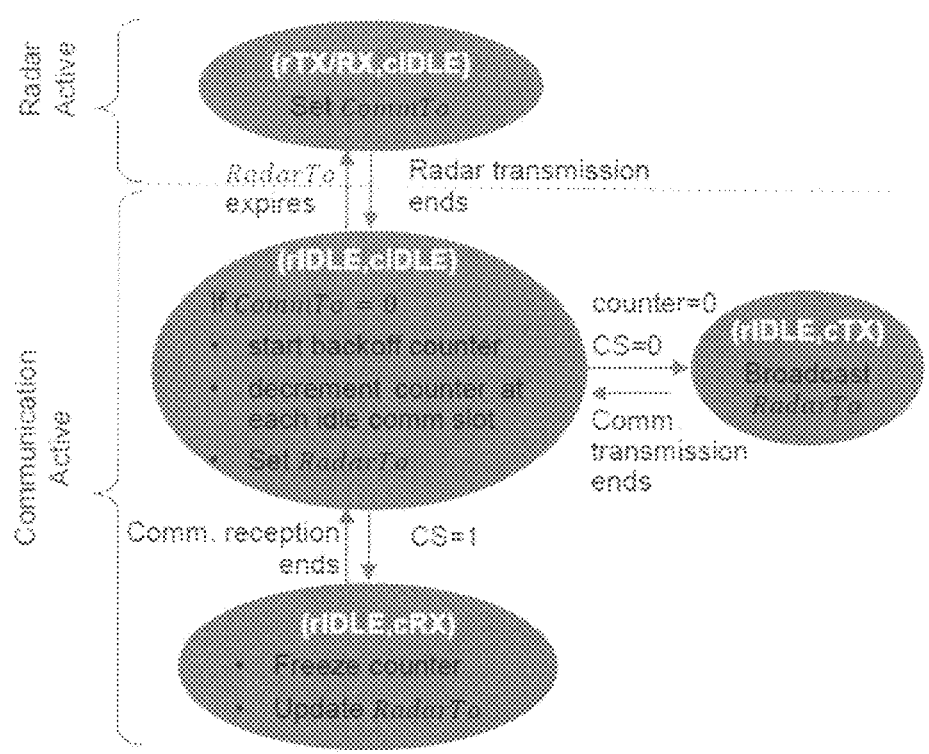
FIG. 3 shows a schematic view of a RadCom unit according to the invention.

A state diagram for the proposed RadCom scheme is given in FIG. 3, where each state denoted by (rX, cY) corresponds to radar state X and communication state Y. Radar is active in (rTX/RX,cIDLE) state and upon end of radar transmission the RadCom hardware enters (rIDLE, cIDLE) state, where communications is active and carrier sensing is deployed. Upon expiration of CommTo, a backoff counter starts and decrements for each idle SlotTime. If carrier is sensed idle when the counter expires (counter=0 and CS=0), the state (rIDLE,cTX) is entered, where the vehicle broadcasts its RadarTo. Otherwise if carrier is sensed busy, the state (rIDLE,cRX) is entered (CS=1), where reception takes place and any active backoff counters are frozen. In this state, the ego vehicle stores the received radar timeout values of other vehicles and updates its own RadarTo to be advertised according to the received radar timeout so as to use one of the left rTDMA slots in $T_k$ or in $T_{k+1}$, etc. No measures are taken in case of communication failures.

In the described example, a radar communication system in which different radar transmitters are designated different starting times is provided. In this way, it can be avoided that more than one radar transmits a radar signal at the same time, which will reduce or mitigate interference between the radar signals. The starting time for a radar in an ego vehicle is transmitted to the other radar units in the vicinity. The other radar units may be positioned in other vehicles, e.g. target vehicles, but may also be installed in e.g. road side units, such as traffic lights, road signs etc. The other radar units will store the starting time of the ego vehicle and will adjust its own starting time to another starting time, which does not interfere with the starting time of the ego vehicle.

With more radar units present, the starting time of the other radar units will be stored and the starting time of the own radar units will be set to a starting time that does not interfere with any of the other radar units. The same applies to all of the radar units. Each radar units will receive the starting times of all the other radar units and will adjust its own starting time to a starting time that does not interfere with the other starting times.

In some cases, it may be that two starting times interfere with each other at a first moment, but when the radar units receives the starting time of the other radar unit, it will adjust the starting time to a starting time that is not used by another radar unit. After one or a few iterations, all radar units within reach of each other will have set a unique starting time for its own radar unit.

Table 1 gives some typical values that may be used in a radar communication system of a vehicle.

TABLE 1

| | Parameter | Value |
|---|---|---|
| Radar | Chirp duration (T) | 20 µs |
| | Frame duration ($T_f$) | 20 ms |
| | Modified duty cycle (U') | 0.1 |
| | Radar bandwidth | 0.96 GHz-1 GHz |
| | $d_{max}$ for $B_c = 0$ | 150 m |
| | $v_{max}$ | 140 km/h |
| | $P_r$, $P_c$ | 11 dB |
| | SNR | 10 dB |
| | Number of chirps per frame (N) | 99 |
| | Carrier frequency ($f_r$) | 77 GHz |
| | $T_s$ | 0.01 µs |
| | Chebyshev low-pass filter order | 13 |
| | Thermal noise temperature $T_0$ | 290 K |
| | Receiver's noise figure | 4.5 dB |
| Comm. | Communication bandwidth $B_c$ | 40 MHz |
| | Packet size ($N_{pkt}$) | 4800 Bits |
| | Modulation | 16-QAM |
| | MAC | non-persistent CSMA |
| | SlotTime δ | 10 µs |
| | Maximum contention window size ($W_0$) | 6 |
| | Maximum backoff stage (B) | 3 |

Two facing vehicles are assumed to comprise RadCom units provided with the same properties, where the radar is an FMCW with sawtooth waveform. The chirp sequence is designed so as to meet the maximum detectable relative velocity $v_{max}$=140 km/h, the maximum detectable range $d_{max}$=150 m when $B_c$=0, velocity resolution smaller than 1 m/s and range resolution of 15 cm. The mean value for the radar cross section of a car is set as 20 dBsm. At the signal processing stage, coherent pulse integration is applied. Moreover, a Blackman-Harris window to reduce the height of the sidelobes is applied before the FFT module. Finally, greatest of cell averaging constant false alarm rate (GoCA-CFAR) thresholding with 50 training cells with 2 guard cells is used for radar detection. The vulnerable duration for $B_c$=40 MHz is computed to be |V|=2.08 µs, leading to maximum 7 concurrent radar transmissions per $T_k$, resulting with $M_{max}$=70 vehicles at maximum are supported by the radar communication system.

In a further example of the invention, a radar communication system is provided in which radar-to-radar (R2R) interference, radar-to-communication (R2C) interference and communication-to-radar (C2R) interference is reduced. This is provided with a radar communication system comprising a radar communication (RadCom) unit and where radar and communication signals with similar powers does not share the same time-frequency resources. R2R interference among different automotive radars is reduced by letting the FMCW radar chirp sequences start sweeping the frequency band at different time slots. In the radar communication system, a protocol, referred to RadChat, for the physical (PHY) and medium access control (MAC) layers is able to essentially reduce R2R radar interference among both radars on different vehicles and radars mounted on the same vehicle in a fairly short time (80 ms).

Figure 4:
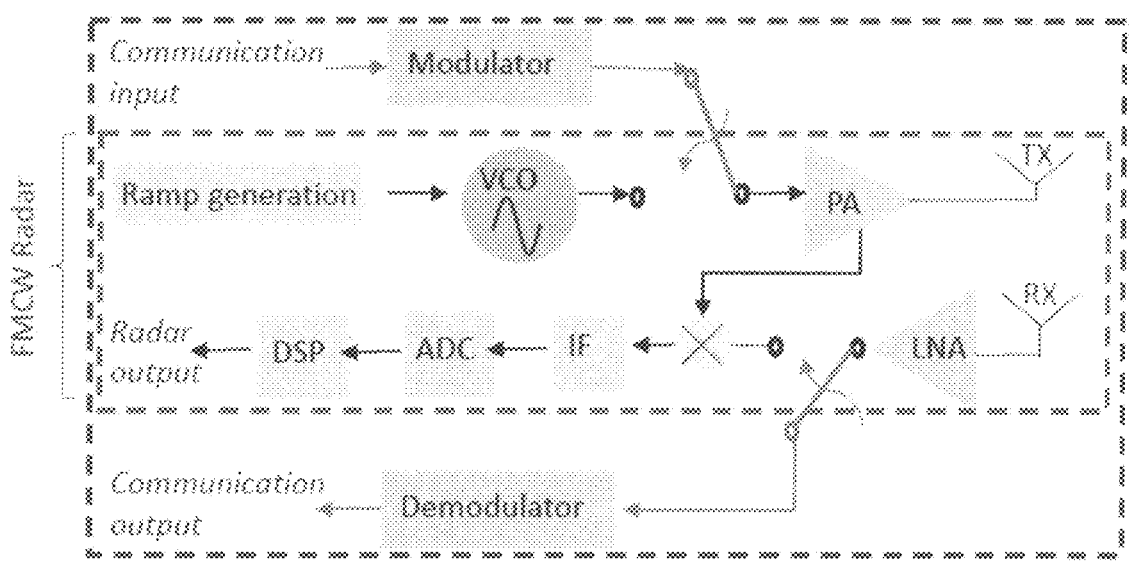
FIG. 4 shows a state diagram for a RadCom unit according to the invention.

In this example, a RadCom unit is a modified automotive FMCW radar hardware, where the FMCW radar is switched between a radar mode for transmitting and receiving radar waves and a communication mode for transmitting and receiving control messages. In the RadCom unit, the input to the conventional FMCW radar transmitter is switched between radar and communication and likewise the receiver antenna output is switched between the radar and communication receiver module as illustrated in FIG. 4. In the described example, a homogeneous vehicular ad-hoc network (VANET) with identical RadCom units are used, where all vehicles have the same radar and communication parameters (radar frame time, radar slope, radar bandwidth/carrier frequency, communication bandwidth/carrier frequency/modulation scheme, etc.). RadCom units transmit and receive either radar or communication signals, but not both radar and communication signals simultaneously. The communication input/output and radar output of the RadCom unit is connected to a MAC layer of the system.

The transmitter of the RadCom unit either transmits radar signals or communication signals, but not both at the same time, as illustrated in FIG. 4. The FMCW radar transmitter transmits a sequence of frequency modulated continuous waves, i.e., chirps c(t), as described above.

In order to reduce or mitigate interference between a plurality of RadCom units arranged in a plurality of different vehicles and possibly also stationary RadCom units arranged in e.g. road signs, a communication protocol referred to as RadChat is used. The protocol comprises information regarding the operation parameters of a RadCom unit, and is transmitted to all RadCom units within communication distance. All RadCom units will transmit the RadChat protocol to all other RadCom units, and will receive the RadChat protocol from all other RadCom units.

Figure 5:
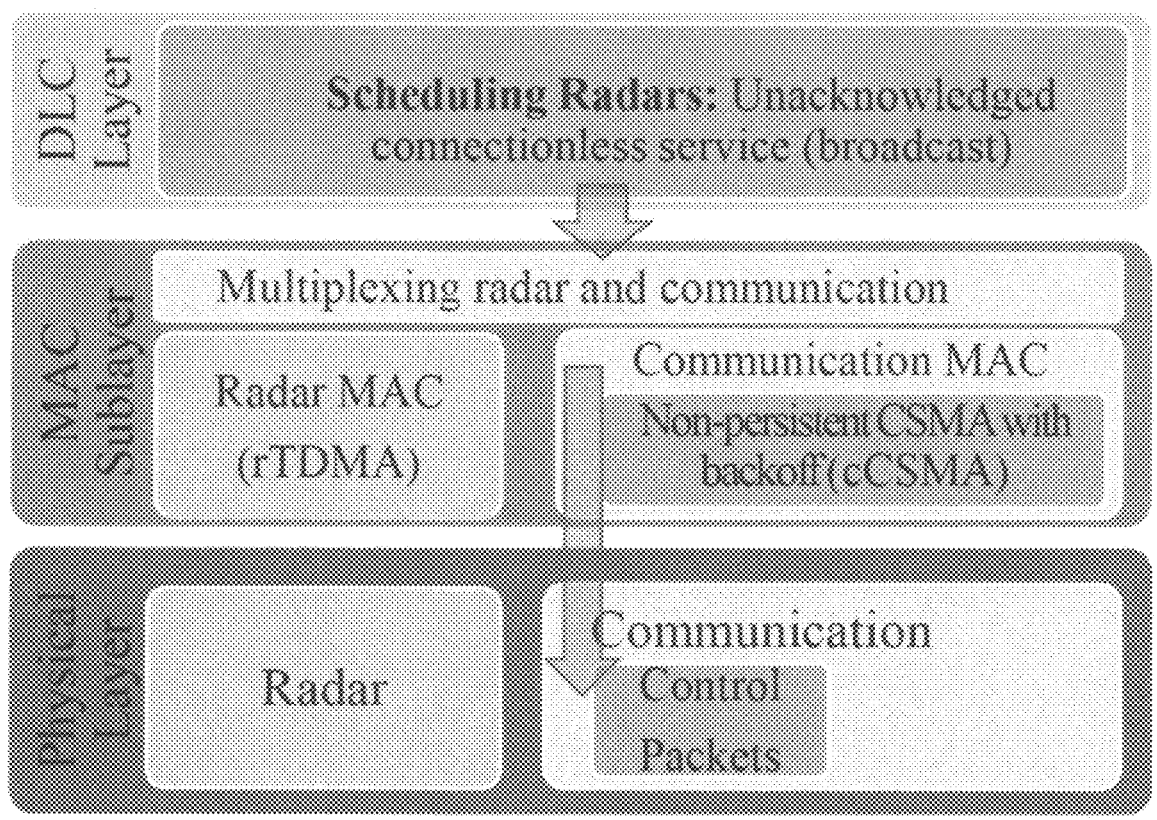
FIG. 5 shows a schematic view of the layered architecture of a RadChat protocol according to the invention.

RadChat is a distributed radar communications based automotive radar interference mitigation protocol, which avoids R2R interference by scheduling radar sensing to non-overlapping vulnerable periods, while R2C and C2R interferences are avoided by using a separate communication control channel in order to ensure non-conflicting time-frequency blocks for communication and radar. The layered architecture of RadChat is summarized in FIG. 5. A RadCom unit is responsible of data link control (DLC), MAC sublayer and physical (PHY) layer functions. Upper layer functions are assumed to be processed at a central unit at each vehicle, which combines data of all RadCom units, which are co-located on a vehicle looking toward different directions. The main service provided by the DLC layer is scheduling of radars, i.e. assigning non-overlapping vulnerable periods to radars, and is an unacknowledged connectionless service.

Broadcast communication control packets are used to schedule radar packets at non-overlapping time slots. Given that the PHY layer operates as described in the previous sections, the MAC layer of RadChat operates by FDM/rTDMA/cCSMA, which is a scheme based on frequency division multiplexing (FDM) between radar and communication, time division multiple access for radar transmissions (rTDMA), and carrier sense multiple access for communications (cCSMA). FIG. 2 illustrates the division of the frequency-time domain for the proposed DLC service with respect to two specific RadCom units $r_i$ and $r_j$. Radars are scheduled by assigning each a different rTDMA slot, where rTDMA slots are defined as radar slots with disjoint vulnerable periods.

In a general but fixed vehicular ad-hoc network (VANET) topology, let $\mathcal{G}$ be a undirected connectivity graph with $\mathcal{G} = (\mathcal{V}, \mathcal{E})$, where each vertex corresponds to a RadCom unit $r_i \in V$ and each edge $e_{ij}$ means that the RadCom unit $r_i$ is connected to the RadCom unit $r_j$ or $r_i$ is facing $r_j$, i.e., $r_i$ is able to receive/transmit communication signals from/to $r_j$, assuming symmetric communication links. Links may be established through line of sight or reflected paths. A given vehicle X may be equipped with multiple RadCom units, which are connected to one central processing unit at vehicle X. Let $S_X$ denote the set of RadCom units mounted on vehicle X. Each $r_i \in S_X$ uses a different rTDMA slot to handle R2R self-interference, which is the R2R interference among radars mounted on the same vehicle. All vehicles use a common radar band $B_r$ and a common communication band $B_c$, with $B_c < B_{max}$, in order to be able to reuse the radar ADC of the RadCom unit. We assume equal radar and communication transmit powers ($P_c = P_r$) for simplicity and to ensure that RadChat provides longer communication range than radar range. Since any radar interference with a larger propagation delay than $T_{max}$ will have an IF frequency larger than $B_{max}$ and filtered out at radar receiver, $P_c = P_r$ guarantees that any potential R2R interferer, the received power of which is high enough to be detected by the radar, is communicated.

The system comprises time slots $T_k$ of duration $(N+1)T \leq T_f$ which corresponds to the duration of N chirps plus one idle chirp time accounting for the overflow of time shifted rTDMA slots. Let U' be defined as the modified radar duty cycle of RadChat, where $U'=(N+1)T \leq T_f$. Hence, a radar frame is divided to time slots $T_k$, $1 \leq k \leq 1/U'$. This slotted time is set to provide non-overlapping chirp sequences within a radar frame and thereby maximize the number of vehicles with no mutual interference, denoted by $M_{max} \leq \lfloor 1/U' \rfloor \lfloor B_r/(CB_{max}) \rfloor$. Each time slot $T_k$ is further divided to slots called SlotTimes $\delta$, which are large enough to detect channel activity by the carrier-sensing function of the CSMA mechanism. Vehicles are assumed to synchronize their clocks using GPS.

Each RadCom unit $r_i$ on vehicle X has several MAC state variables that are broadcast to other RadCom units in other vehicles:

$r_i$.ID, which is an identifier of the time reference, initialized to the vehicle index X.

$r_i$.SI, which is an rTDMA slot index in the local time reference, initialized to 0. During operation, $r_i$.SI $\in \{1, \ldots, M_{max}\}$.

$r_i$.$t_{rs}$, which is a radar start time, initialized uniformly in $[0, T_f]$ incremented by $T_f$ every frame.

$r_i$.strength, which is a priority indicator, coupled to $r_i$.ID, initialized to 0.

All RadCom units mounted on the same vehicle use the same ID and strength values, whereas SI and $t_{rs}$ are specific to each RadCom unit assigned by the central processor at vehicle X. We will denote the set of all of the rTDMA slot indices used by RadCom units mounted on the vehicle X by $S_X$.SI, whereas the set of all of the radar start times are denoted by $S_X$.$t_{rs}$.

Due to the distributed nature of the algorithm, each vehicle X will assign rTDMA slots according to its own time frame initially. The couple ($r_i$.ID, $r_i$.SI) specifies a unique rTDMA slot index for all radars that have the same time reference $r_i$.ID. The variable $r_i$.strength is used to give priority to the time reference which is shared the most in the network, in order to avoid fluctuations among different time references.

Communication functions are common to all $r_i \in S_X$. Hence, a base RadCom unit $r_i^* \in S_X$ on vehicle X is selected according to which timing of communication functions are conducted. Each vehicle also keeps track of these MAC state variables of the base RadCom unit $r_i^*$ during operation, which are not broadcast:

$r_i^*$.counter is a binary exponential backoff (BEB) counter, initialized by a random integer rand$([0, 2^b W_i - 1])$, where b is the backoff stage and $W_0$ is the maximum contention window size; b is incremented upon each busy carrier sense until $b \leq B$, where B is the maximum backoff stage. b is reset at the end of $T_{k-1}$.

$r_i^*$.$t_{cs}$ is a communication starting time, initialized to $r_i^*$.$t_{cs} = r_i^*$.$t_{rs} - (N+1)T - T_{pkt} + \delta r_i^*$.counter, where $T_{pkt}$ is the duration of a control packet. $r_i^*$.$t_{cs}$ is updated whenever the radar start time of the base RadCom unit on vehicle X, is changed.

The media access control (MAC) operation of the RadChat protocol uses a best effort approach by unacknowledged communications since communication links may lose symmetry due to highly mobile VANET structure. In order to assign non-overlapping rTDMA slots among facing RadCom units, non-persistent CSMA with BEB is employed. rTDMA slots in $T_k$ are generally determined by communication contention during time slot $T_{k-1}$. Communication packets are transmitted if the channel is sensed idle for one SlotTime $\delta$ or random BEB is employed if channel is sensed busy. Each vehicle X may prefer to allocate all radar transmissions of its mounted RadCom units in the same time slot $T_k$, $S_X$.$t_{rs} \in T_k$ (if number of RadCom units on a single vehicle is $\leq \lfloor B_r/(CB_{max}) \rfloor$).

However, it is not necessary to squeeze all radar transmissions of a vehicle to a single time slot $T_k$. But it is necessary that at least one time slot $T_{k-1}$ is empty with no transmitted radar signals, so that it can be used for communication jointly by all $r_i^* \in S_X$.

Each vehicle X, which has a set of random radar start times $S_X$.$t_{rs}$, selects a contention period, preferably the prior time slot $T_{k-1}$ where most of the radar start times reside in $T_k$ and selects a base RadCom unit $r_i^*$, $r_i^*$.$t_{rs} \in T_k$ according to which communication start time $r_i^*$.$t_{cs}$ is calculated. $\forall r_i \in S_X$ transmit a single communication control packet during $T_{k-1}$. This control packet is broadcast to all RadCom units connected to the vehicle X (as if omni-directional communication) and contains the following information: identity of the transmitter ($r_i$), time reference frame ($r_i$.ID) and the set of all rTDMA slot indices of RadCom units mounted on vehicle X ($S_X$.SI), strength of this time reference frame ($r_i$.strength), and the base RadCom unit's radar starting time and its slot index $r_i^*$.$t_{rs}$, $r_i^*$.SI).

The MAC functions of the RadChat protocol are the following:

RadChat Carrier Sensing: Suppose that a RadCom unit $r_i$ on vehicle X intends to start radar transmission at $r_i$.$t_{rs} \in T_k$ in FIG. 2. This RadCom unit carrier-senses the communication channel 8, during the entire radar frame $T_f$ except during $T_k$ (as it is transmitting radar signals), and receive incoming communication packets.

RadChat Transmission at $T_{k-1}$: A communication packet transmission is scheduled at $r_i^*.t_{cs} \in T_{k-1}$. During $T_{k-1}$, carrier sensing is employed A communication packet is sent if channel is sensed as idle, or backoff is employed if channel is sensed as busy (and $r_i^*.t_{cs} \leftarrow r_i^*.t_{cs} + \delta r_i^*.t_{counter}$). Upon completion of transmission of a communication packet by the RadCom unit $r_i$, if $r_i.SI=0$, the value is set to the assigned value by the central processor of the vehicle, otherwise it is left unchanged. If no control packet is transmitted during $T_{k-1}$ and time to begin radar transmission has come, i.e., $r_i^*.t_{cs}+T_{pkt} \notin t_{k-1}$, then the transmission of a control packet with a control message is skipped for the current radar frame and scheduled for the next frame time.

RadChat Reception at $T_{k-1}$: Upon reception of a control packet from $r_i$ by $r_j$ (which was not transmitting radar at that time), $r_j$ updates its state, see Algorithm 1. Throughout the operation of the RadChat protocol, each RadCom unit stores the received ID, SI and strength information in a local database $D_j$. This is used to keep track of unused rTDMA slots for a time reference, and the priority of the time reference. In lines 5, 10, and 15 the SI should be selected within $T_k$ if available, otherwise from the set of unused rTDMA slots in $T_f$. This algorithm ensures that $r_j.SI$ is assigned so that $r_j.SI \neq S_{X}.SI \cup D_j$. $r_j.t_{rs}$ and $r_j.t_{cs}$ in Line 16 are set according to $r_j.t_{rs} \leftarrow r_i.t_{rs}+(N+1)T\{K_j-K_i\}+|V|\{\kappa_j-\kappa_i\}]r_j.t_{cs} \leftarrow r_j^*.t_{rs}-(N+1)T-T_{pkt}+\delta r_j^*$.counter.

with $\kappa_j = \mod(r_j.SI, U'M_{max})$, $K_j = \lceil r_j.SI/(U'M_{max}) \rceil$, where $r_j^*$ is the a base RadCom unit of the receiving vehicle.

---

Algorithm 1.

1: Store $(r_i.ID, r_i.SI, r_i.strength)$ in $\mathcal{D}_j$
2: if $r_j.SI = 0$ then
3:     $r_j.ID \leftarrow r_i.iD$
4:     $r_j.strength \leftarrow r_i.strength + 1$
5:     $r_j.SI \leftarrow SI \in T_k \cup T_f \setminus \{S_X.SI\}$
6: else
7:     if $r_j.ID = r_i.ID$ then     ▶ same time reference
8:         $r_j.strength \leftarrow \max(r_j.strength, r_i.strength) + 1$
9:         if $r_j.SI \in S_X.SI$ then
10:           $r_j.SI \leftarrow SI \in T_k \cup T_f \setminus \{r_i.SI | i \in \mathcal{D}_j\}$
11:     else     ▶ different time reference
12:         if $r_i.strength > r_j.strength$ then
13:           $r_j.ID \leftarrow r_i.iD$
14:           $r_j.strength \leftarrow r_i.strength + 1$
15:           $r_j.SI \leftarrow SI \in T_k \cup T_f \setminus \{S_X.SI\}$
16: Calculate $r_j.t_{rs}$ and $r_j.t_{cs}$ if $(r_j.ID, r_j.SI)$ has changed
17: Update state of all other RadCom units on same vehicle

---

For a fixed connected network topology and with less than $M_{max}$ active radars, the RadChat protocol is guaranteed to eventually converge to a solution where each vehicle uses a distinct rTDMA slot and thus R2R interference is eliminated, when the following conditions are met:

The radar duty cycle of RadChat must satisfy $U' \leq 1/3$. Since RadCom units cannot receive control packets when radar is active, a higher radar duty cycle may end up with two disjoint interfering networks. Higher duty cycle necessitates the use of a separate communication module for mitigation of FMCW radar interference with RadChat.

RadCom allows synchronization errors of at most $|V|/2$ across vehicles, since it places each radar transmission in the middle of a vulnerable period leaving a guard time. Under perfect synchronization, RadChat can allocate up to $2M_{max}$ non-interfering RadCom units by a time spacing of $|V|/2$ (so that non-overlapping radar bandwidths of $B_{max}$ fill the whole time-frequency domain in FIG. 2).

Bandwidth reserved for communication $B_c$ should allow for at least one data packet during $T_k=(N+1)T$:

$$(N+1)T > T_{pkt} = \frac{8N_{pkt}/\log_2(|\Omega|)}{B_c/(1+\alpha)}$$

$$B_c > \frac{8N_{pkt}(1+\alpha)}{(N+1)T\log_2(|\Omega|)}$$

where $|\Omega|$ is the constellation size.

Some properties of RadChat protocol are as follows:

RadChat takes care of both R2R interference among vehicles and among radar units mounted on the same vehicle, i.e., self-interference.

RadChat eliminates any potential R2R interference. $P_c=P_r$ ensures that the potential interferers with propagation delays less than the maximum radar round trip time $T_{max}$ are communicated and allocated different rTDMA slots. The potential interferers with propagation delays more than $T_{max}$ are either filtered out at radar receiver circuity (if a perfect low-pass filter with bandwidth $B_{max}$ is used) or have low received radar signal power.

RadChat ensures that R2R mitigation is completed in a short time and starts as soon as a potential interferer enters the communication range if radar interference and communication signals are subject to the same minimum signal to noise ratio at the RadCom receiver and $P_r=P_c$.

In the described examples, the communication protocol is used for sending information to other vehicles in order to mitigate radar interference between radar units. The communication protocol may also be used to share data information, such as radar maps of vehicles or warning messages or see-through driving data/video images, to other vehicles.

By communicating other information, a secure network among vehicles can be provided. Each vehicle is able to detect with its radar sensor the other vehicles that it receives information from. In this way, a vehicle can be sure that the received information is proper and is received from the right sender. An attacker vehicle disseminating a fake information would not work here. This will provide a secure network among vehicles.

It is also possible to change or adapt the radar parameters according to traffic scenarios by using communication. Radar sensing can be deactivated for some time if no other vehicles are around, radar sensing frequency can be increased not to skip any target movements in congested traffic, etc. The information of how to adapt radar in a network of vehicles can be communicated among vehicles.

The invention is not to be regarded as being limited to the embodiments described above, a number of additional variants and modifications being possible within the scope of the subsequent patent claims.

The invention claimed is:

1. A distributed FMCW radar communication system for interference mitigation in an ego unit comprising a RadCom unit configured for radar sensing in a radar mode and for data communication in a communication mode with at least one target unit comprising a RadCom unit by switching between the radar mode and the communication mode in time and using separate frequency bands for the radar mode and the communication mode, using a random medium access technique for communication, the distributed FMCW radar communication system being configured such that a communicated control message information is used for co-allocated multiple FMCW radar sensors in both the ego unit and the at least one target unit to a portion of a radar frame duration ($T_f$) which is one of a plurality of radar frame durations ($T_f$), wherein the ego unit and the at least one target unit transmit a control message, in each radar frame duration ($T_f$), the control message comprising a starting time of radar transmission of each unit to the other units prior to radar transmission of each unit, such that each unit selects a non-overlapping starting time for its radar transmission and wherein the starting times of different FMCW radar sensors are separated sufficiently such that they are orthogonal, wherein one of the plurality of radar frame durations ($T_f$) of the FMCW radar communication system is divided in a number of time slots ($T_k$), where the RadCom unit of the ego unit is in the communication mode in a first time slot and transmits a radar control message which is one of the control messages, and where in the following time slot the RadCom unit of the ego unit is in the radar mode and transmits radar chirps, and where the RadCom unit of the ego unit is in the communication mode configured to receive a control message in all time slots except the time slot in which it is in the radar mode.

2. A distributed FMCW radar communication system according to claim 1, wherein the random medium access technique for communication includes use of a CSMA protocol with random backoff.

3. A distributed FMCW radar communication system according to claim 1, wherein the frequency band for the radar mode in the ego unit and the at least one target unit is the same, and wherein the frequency band for the communication mode in the ego unit and the at least one target unit is the same.

4. A distributed FMCW radar communication system according to claim 1, wherein a vulnerable period (V) is determined, where the vulnerable period is a set of time values in a radar frame ($T_f$) where interference between the ego unit and the target unit has not been detected by the FMCW radar sensors and is expected to occur.

5. A distributed FMCW radar communication system for interference mitigation in an ego unit comprising at least one RadCom unit configured for radar sensing in a radar mode and for data communication in a communication mode with at least one target unit, comprising at least one RadCom unit, by switching between the radar mode and the communication mode in time and using separate frequency bands for the radar mode and the communication mode, using a random medium access technique for communication, where the ego unit comprises a plurality of RadCom units and a control unit configured to control the plurality of RadCom units to use different starting times and frequency bands based on at least one received control message by means of communication during a radar frame duration ($T_f$), which is one of a plurality of radar frame durations ($T_f$), received by means of the data communication, wherein the ego unit and the at least one target unit transmit a control message, in each radar frame duration ($T_f$), the control message comprising a starting time of radar transmission of each unit to the other units prior to radar transmission of each unit, such that each unit selects a non-overlapping starting time for its radar transmission and wherein the starting times of different FMCW radar sensors are separated sufficiently such that they are orthogonal, wherein one of the plurality of radar frame duration ($T_f$) of the FMCW radar communication system is divided in a number of time slots ($T_k$), where the RadCom unit of the ego unit is in the communication mode in a first time slot and transmits a radar control message which is one of the control messages, and where in the following time slot the RadCom unit of the ego unit is in the radar mode and transmits radar chirps, and where the RadCom unit of the ego unit is in the communication mode configured to receive a control message in all time slots except the time slot in which it is in the radar mode.

6. A distributed FMCW radar communication system according to claim 5, wherein the control message comprises: an identity of the transmitter ($r_i$), a time reference frame ($r_i$.ID) and the set of all rTDMA slot indices of the RadCom units mounted on unit X ($S_x$.SI), a strength of the time reference frame ($r_i$.strength), the base RadCom unit's radar starting time and its slot index ($r_i^*.t_{rs}$, $r_i^*.SI$).

7. A distributed FMCW radar communication system according to claim 5, wherein a vulnerable period (V) is determined, where the vulnerable period is a set of time values in a radar frame ($T_f$) and slot indices are the corresponding numbered set of possible starting times, where interference between the ego unit and the target unit has not been detected by FMCW radar sensors and is expected to occur.

8. Vehicle, wherein the vehicle comprises a distributed FMCW radar communication system according to claim 1.

* * * * *